Figure 2:
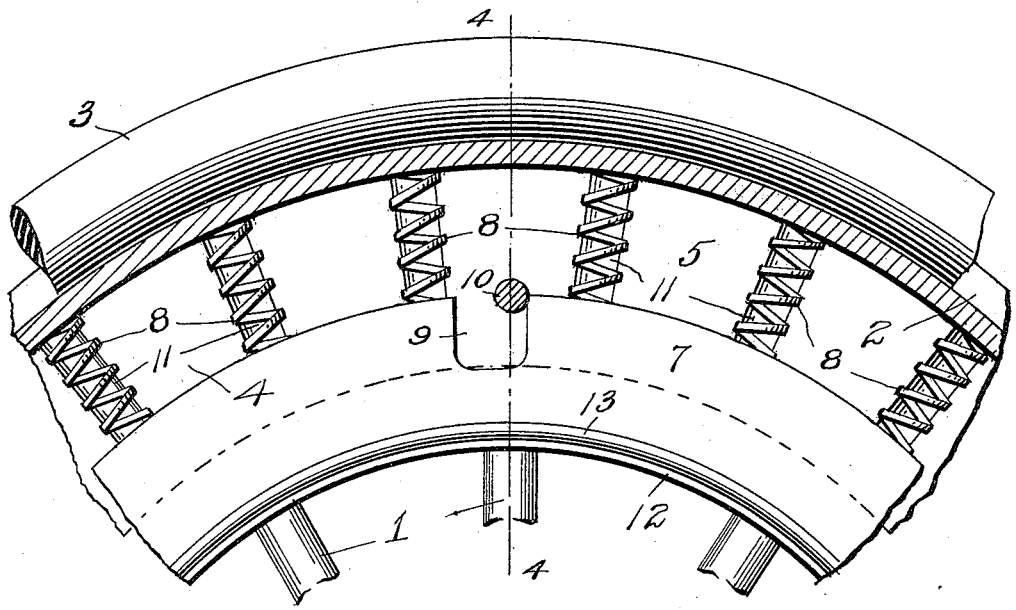

A. W. ABERNATHY.
VEHICLE WHEEL.
APPLICATION FILED SEPT. 26, 1910.
993,332.
Patented May 23, 1911.
3 SHEETS—SHEET 1.
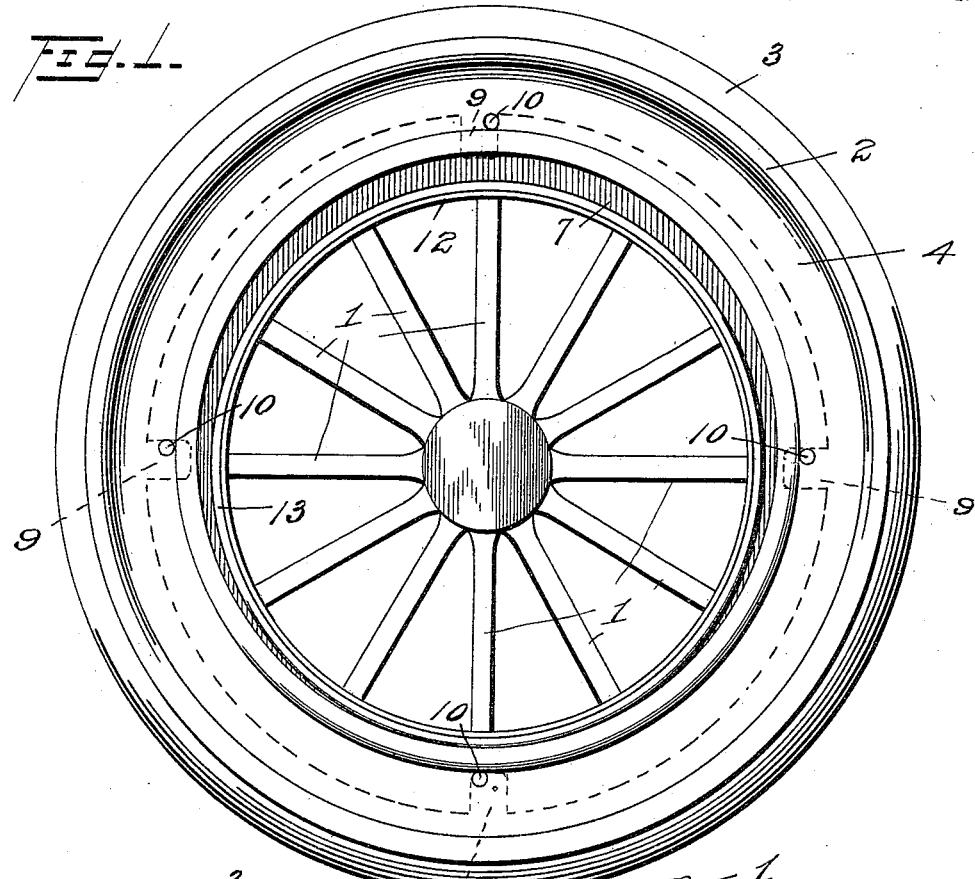
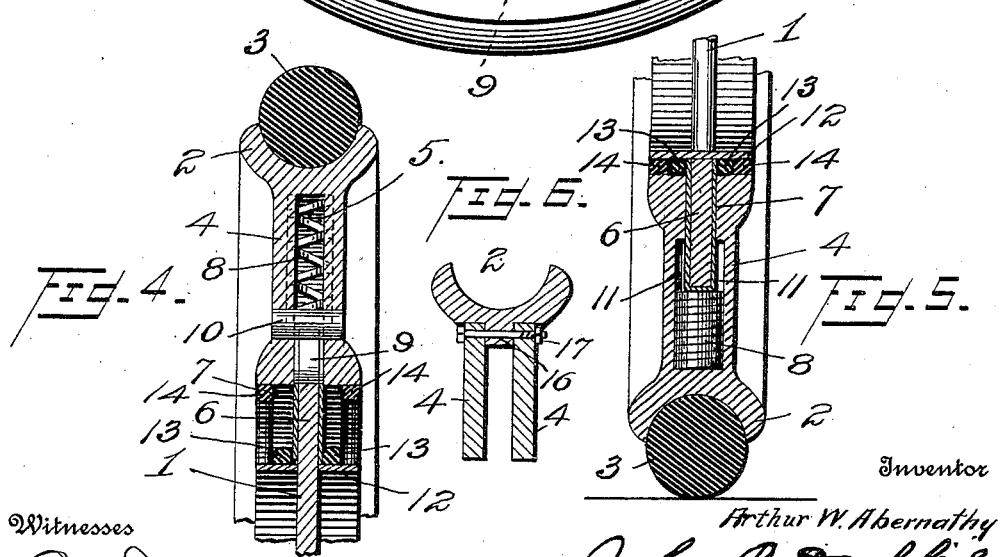
Witnesses
Inventor
Arthur W. Abernathy
By John P. Duffie
His Attorney

A. W. ABERNATHY.
VEHICLE WHEEL.
APPLICATION FILED SEPT. 26, 1910.

993,332.

Patented May 23, 1911.
3 SHEETS—SHEET 2.

Witnesses
Inventor
Arthur W. Abernathy
By
His Attorney

A. W. ABERNATHY.
VEHICLE WHEEL.
APPLICATION FILED SEPT. 26, 1910.
993,332.
Patented May 23, 1911.
3 SHEETS—SHEET 3.
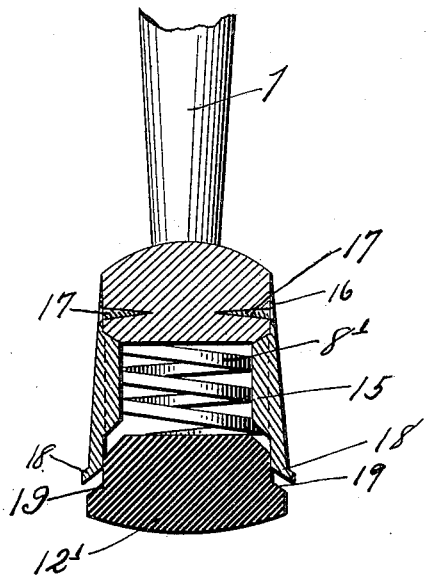
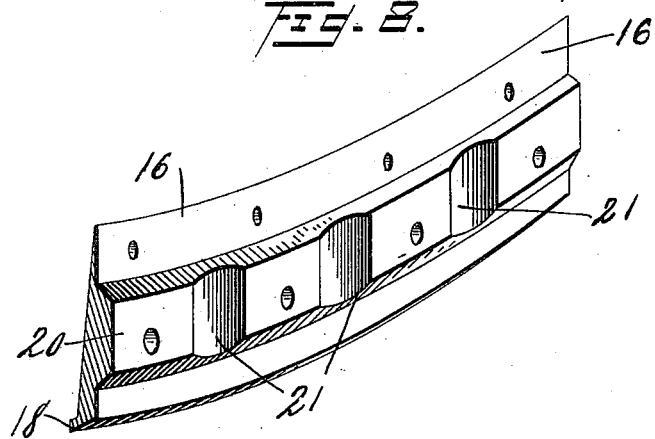
Witnesses
Inventor
Arthur W. Abernathy
By John P. Duffie
His Attorney

UNITED STATES PATENT OFFICE.

ARTHUR W. ABERNATHY, OF CHAMPAIGN, ILLINOIS.

VEHICLE-WHEEL.

993,332.          Specification of Letters Patent.      Patented May 23, 1911.

Application filed September 26, 1910. Serial No. 583,791.

*To all whom it may concern:*

Be it known that I, ARTHUR W. ABERNATHY, a citizen of the United States, residing at Champaign, State of Illinois, have invented certain new and useful Improvements in Vehicle-Wheels, of which the following is a specification.

This invention relates to new and useful improvements in vehicle wheels.

The primary object of this invention is to do away with the expensive pneumatic tire used on automobile wheels and yet give the same service and the same if not greater ease in taking up jolts or jars induced in the wheels in passing over rough or irregular places.

With the foregoing and other objects in view, the invention consists in the novel features of construction, combination and arrangement of parts illustrated in the drawings and more particularly pointed out in the appended claim.

Figure 3:
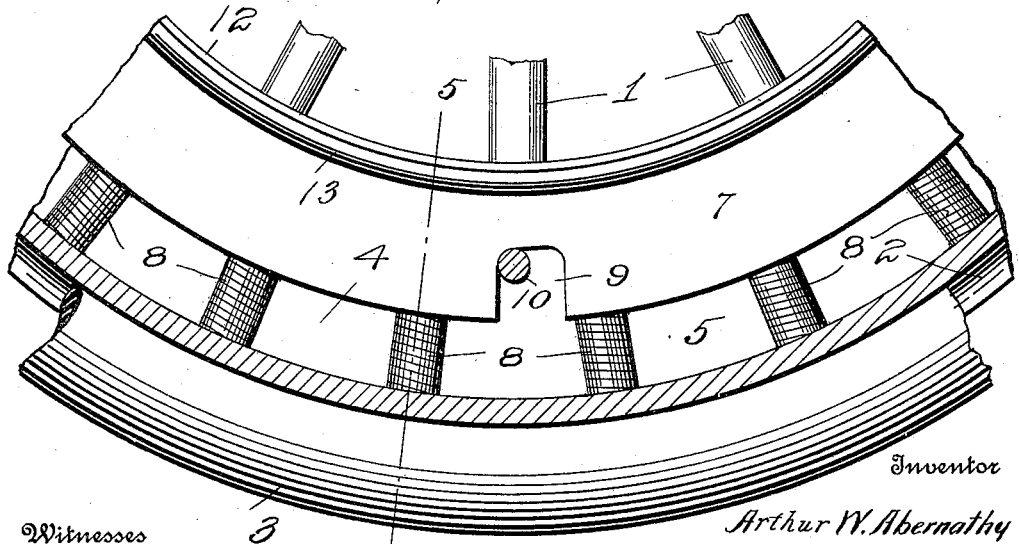

In the accompanying drawings:—Figure 1 is a side elevation of a vehicle wheel embodying my improvements. Fig. 2 is a fragmentary sectional view on an enlarged scale, of the top portion of the wheel. Fig. 3 is a similar view of the bottom portion thereof. Fig. 4 is a sectional view, taken on the line 4—4 of Fig. 2. Fig. 5 is a similar view, taken on the line 5—5 of Fig. 3. Fig. 6 is a sectional view of the rim as constructed of three parts. Fig. 7 is a fragmentary sectional view, illustrating a modified form of the wheel, and Fig. 8 is a detail perspective view of a portion of one of the side plates, shown in Fig. 7.

Referring to the drawings for a more particular description of the invention and which drawings are for illustrative purposes only and are therefore not drawn to scale, the numeral 1 indicates the spokes, 2 the rim and 3 the solid outer tire of a vehicle wheel constructed in accordance with the present invention. The felly 4 of the rim 2 is provided in its inner edge with the centrally disposed circumferential groove 5 which extends entirely around the same and is of a depth to correspond therewith. The wheel further comprises the bearing ring 6 of uniform thickness which is preferably constructed of wood, fits in the groove 5 of the rim and is incased by the thin steel casing 7. A continuous series of coil springs 8, placed about one half inch apart, are arranged in the groove 5 of the rim 2 and bear against the edge of the ring 6. These springs are successively depressed, as indicated in Figs. 3 and 5, as the wheel passes over the ground or other surface, and are for the purpose of taking up any shocks or jolts induced in the wheels due to irregularities in the surface in order to insure the same easy riding as would be enjoyed through the use of an expensive pneumatic tire.

To prevent the bearing ring 6 from creeping on the rim 2, the former is provided in its inner edge at a number of points with the inwardly extending radial slots 9, in which are adapted to work the retention pins 10 carried by and passing transversely through the outer edge of the bearing ring. These slots are made sufficiently wide to provide for the required play or shifting of the ring as the springs are depressed.

The felly 4 of the rim 2 is provided in the inner faces of its side pieces with the radial grooves 11 to receive the opposite sides of the springs 8 and thus provide for their effective retention in place.

The spokes are connected by the steel band 12 provided on its under surface at opposite edges with the rubber strips 13 which are pressed against the rubber strips 14 on the felly as the wheel rotates and compresses the springs. The purpose of these strips is to prevent any water or dust from accumulating in the felly of the rim.

The rim and felly 2 and 4, respectively, may be made in one solid casting, as indicated in Figs. 1 to 5, inclusive, or three separate sections 15 bolted together by the bolts and nuts 16 and 17, to provide for the easy assemblage of the parts.

In the modification illustrated in Figs. 7 and 8, the springs $8^1$ are arranged between the felly of the wheel and the tire $12^1$, thus doing away with the bearing ring 6 and the member 4. In this case, the springs are held in place by the side plates 15, attached at their upper edges 16 by the screws 17 to the rim of the wheel, which have outwardly extending flanges 18 at their inner edges which work and bear in the recessed portions 19 of the tire $12^1$ and are provided upon their inner faces with the ribs 20 formed by an increased thickness of the plates, said ribs having radial grooves or recesses 21 therein to receive opposite sides of the coil springs.

From the foregoing description taken in connection with the drawings, it is thought that the construction and operation of this invention will be readily understood without requiring a more extended explanation.

Various changes in the form, proportions and minor details of construction may be resorted to without departing from the principles or sacrificing any of the advantages of this invention as defined in the appended claim.

Having described my invention, what I claim as new, is:—

A vehicle wheel of the class described comprising an outer rim provided in its inner edge with a continuous circumferential channel provided in its inner walls with oppositely disposed radial recesses, a continuous series of coil springs mounted in the channel of the rim and projecting into the recesses above mentioned, a solid outer tire for the rim, a bearing ring, provided in its outer periphery with a plurality of inwardly extending slots, said ring extending into the channel of the rim and bearing against said springs, and pins passing through the outer rim and the slots of the bearing ring to prevent the bearing ring from creeping on the outer rim when the wheel is in motion.

In testimony whereof I affix my signature in presence of two witnesses.

ARTHUR W. ABERNATHY.

Witnesses:
J. E. MAGUIRE,
BEN M. PRICE.

Copies of this patent may be obtained for five cents each, by addressing the "Commissioner of Patents, Washington, D. C."